US008440116B2

(12) United States Patent
Amanullah et al.

(10) Patent No.: US 8,440,116 B2
(45) Date of Patent: May 14, 2013

(54) LOW VISCOSITY MONO-UNSATURATED ACID-CONTAINING OIL-BASED DIELECTRIC FLUIDS

(75) Inventors: Mohammed Amanullah, Kensington (AU); Syed M. Islam, Bentley (AU); Samer Chami, Belmont (AU); Gary Ienco, Belmont (AU)

(73) Assignee: Biolectric Pty Ltd

( * ) Notice: Subject to any disclaimer, the term of this patent is extended or adjusted under 35 U.S.C. 154(b) by 766 days.

(21) Appl. No.: 12/101,677

(22) Filed: Apr. 11, 2008

(65) Prior Publication Data

US 2009/0140830 A1 Jun. 4, 2009

Related U.S. Application Data

(63) Continuation-in-part of application No. PCT/AU2006/001493, filed on Oct. 11, 2006.

(30) Foreign Application Priority Data

Oct. 11, 2005 (AU) ................................ 2005905593

(51) Int. Cl.
*C09K 5/00* (2006.01)

(52) U.S. Cl.
USPC ............ 252/570; 252/571; 252/572; 252/573

(58) Field of Classification Search ........................ None
See application file for complete search history.

(56) References Cited

U.S. PATENT DOCUMENTS

| | | | | |
|---|---|---|---|---|
| 5,451,334 | A | 9/1995 | Bongardt et al. | |
| 5,949,017 | A | 9/1999 | Oommen et al. | |
| 5,958,851 | A * | 9/1999 | Cannon et al. | 508/491 |
| 6,280,659 | B1 | 8/2001 | Sundin | |
| 6,624,124 | B2 | 9/2003 | Garmier | |

FOREIGN PATENT DOCUMENTS

| | | |
|---|---|---|
| JP | 2000-090740 | 3/2000 |
| JP | 2004-273291 | 9/2004 |
| WO | WO-2004/108871 | 12/2004 |

OTHER PUBLICATIONS

Written Opinion for PCT/AU2006/001493 mailed Jan. 29, 2007.

* cited by examiner

*Primary Examiner* — Necholus Ogden, Jr.
(74) *Attorney, Agent, or Firm* — Marshall, Gerstein & Borun LLP

(57) ABSTRACT

Disclosed herein are a dielectric fluid composition and a method thereof. Also disclosed are viscosity modifiers and a method of lowering the viscosity of an oil-based dielectric fluid. The composition includes an oil with a high mono-unsaturated fatty acid content and one or more fatty acid alkyl esters, each having a fatty acid and an alkyl moiety, wherein the alkyl moiety of the fatty acid alkyl esters has 1 to 4 carbon atoms, and wherein both the oil and the fatty acid alkyl ester are in the range of 40%-60% v/v of the dielectric fluid composition. The viscosity modifier includes one or more fatty acid alkyl esters with an alkyl moiety and a fatty acid moiety, wherein the alkyl moiety has 1 to 4 carbon atoms. The method of lowering the viscosity includes blending the viscosity modifier and a vegetable oil-based dielectric fluid in a ratio of 40:60-60:40.

8 Claims, 2 Drawing Sheets

LOW VISCOSITY MONO-UNSATURATED ACID-CONTAINING OIL-BASED DIELECTRIC FLUIDS

This application is a continuation-in-part of International Application No. PCT/AU2006/001493, filed Oct. 11, 2006, which claims priority from Australian Application No. 2005905593, filed Oct. 11, 2005.

FIELD OF THE INVENTION

The present invention relates to a monounsaturated acid-containing oil-based dielectric fluid, in particular to a monounsaturated acid-containing oil-based dielectric fluid having low viscosity.

BACKGROUND OF THE INVENTION

Dielectric fluids used in electrical distribution and power equipment, including transformers, switching gear and electric cables, perform two important functions. Dielectric fluids act as a dielectric and insulating medium, a cooling medium, and they also reduce the corrosive effects of oxygen and moisture. Analyses of dielectric fluid can provide an indication of the insulating material conditions and thus acts as a diagnostic tool for evaluating the solid insulation condition of the transformer.

There are several specific functional properties characteristic of dielectric fluids. The dielectric breakdown, or dielectric strength, for example, provides an indication of a dielectric fluid's ability to resist electrical breakdown and is measured as the minimum voltage required to cause arcing between two electrodes at a specified gap submerged in the fluid. The impulse dielectric breakdown voltage of a dielectric fluid provides an indication of its ability to resist electrical breakdown under transient voltage stresses such as lightning strikes and power surges. The dissipation factor of a dielectric fluid is a measure of the dielectric losses in the fluid; a low dissipation factor indicates low dielectric loss and a low concentration of soluble, polar contaminants.

Because one function of a dielectric fluid is to carry and dissipate heat, factors that significantly affect the relative ability of the fluid to function as a dielectric coolant include viscosity, specific heat, thermal conductivity, and the coefficient of expansion. The values of these properties, particularly in the range of operating temperatures for the equipment at full rating, must be weighed in the selection of suitable dielectric fluids for specific applications.

An ideal dielectric fluid demonstrates chemical and thermal stability over a long service life of 20-30 years, good electric and thermal properties as described above, low flammability (i.e. high fire and flash points), low viscosity and low pour point, miscibility with existing transformer oils, and is non-corrosive and/or compatible with the electrical equipment material to which it is exposed.

Mineral oil-based dielectric fluids admirably demonstrate the above criteria and thus they have been used extensively throughout the world for over a century in these applications. The volume of mineral oil-based dielectric fluids used in power and distribution transformers worldwide is estimated to be about 30 to 40 billion litres. Increasingly, however, there has been concern that the ideal dielectric fluid should also be biodegradable, non-toxic and renewable so at to exhibit little or no detrimental impact on the environment. Mineral oil-based dielectric fluids are poorly, biodegradable, relatively toxic and have no renewable source. Thus, it is not surprising that alternative dielectric fluids have been sought.

Mono-unsaturated fatty acid-containing oils may be obtained from renewable sources (such as vegetable oil, tallow etc) and thus are attractive candidates for substituting petroleum-based dielectric fluids.

Advantageously, mono-unsaturated fatty acid-containing oils may have higher flash and fire point characteristics than mineral oils, which ensure better safety in operation, handling, storage and transportation of such oils and thus the operational safety of transformers using vegetable oil-based dielectric fluids. The excellent fire safety characteristics of mono-unsaturated fatty acid-containing oil-based dielectric fluids make them ideal candidates for high voltage transformers.

Notwithstanding the above advantages, mono-unsaturated fatty acid-containing oils are susceptible to oxidative degradation, and have a higher pour point, higher dissipation factor, higher acidity number, higher moisture content and significantly higher viscosity compared to mineral oils. Many of these deficiencies can be overcome by subjecting the mono-unsaturated fatty acid-containing oils to purification processes to remove water, acid, and conductive contaminants, and a winterization process to improve the mono-unsaturated fatty acid-containing oil's pour point. Additionally, antioxidants can be added to the purified mono-unsaturated fatty acid-containing oil to enhance its oxidative stability.

Low viscosity of any dielectric fluid is an extremely important parameter as the safe operation of power and distribution transformers highly depend on this parameter. Heat dissipation from hot spots, effective circulation and cooling of transformers, smooth functioning of transformers in high voltage operating conditions is largely controlled by the viscous characteristics of the dielectric fluid.

U.S. Pat. No. 5,949,017 discloses electrical transformers containing electrical insulation fluids comprising high oleic acid oil compositions as an alternative to mineral oil-based dielectric fluids with no/little improvement of the viscous properties of either the base oil or the end products.

U.S. Pat. No. 6,280,659 discloses vegetable seed oil insulating fluids with the improvement of only the low temperature viscous characteristics; i.e. pour point rather than the overall viscous characteristics of the vegetable oil-based dielectric fluid. In fact, the finished dielectric fluid described in U.S. Pat. No. 6,280,659 has a viscosity about 100 cSt measured at 40° C., which is much higher than the typical mineral oil-based dielectric fluid. The improvement of pour point (−18° C.) i.e. low temperature viscous characteristics is not appreciable as the pour point parameters of vegetable oils lies between −15° C. and −25° C.

There is still a significant need for biodegradable dielectric fluids from renewable sources which exhibit good electric and thermal properties, low viscosity, chemical and thermal stability, low flammability, low pour point, miscibility with existing transformer oils and long service life of 20-30 years comparable to existing dielectric fluids based on mineral oils.

The present invention overcomes at least some of the above mentioned disadvantages of known vegetable-oil based dielectric fluids by providing a low viscosity mono-unsaturated fatty acid-containing oil-based dielectric fluid.

It is to be understood that, although prior art use and publications may be referred to herein, such reference does not constitute an admission that any of these form a part of the common general knowledge in the art.

SUMMARY OF THE INVENTION

The present invention is based on the realisation that a low viscosity mono-unsaturated fatty acid-containing oil-based dielectric fluid with insulating and cooling properties comparable to mineral oil-based dielectric fluids can be obtained by blending a mono-unsaturated fatty acid-containing oil-based dielectric fluid with an alkyl ester.

The term “dielectric fluid” as used herein refers to a non-flammable fluid used in electrical distribution and power equipment, such as for example transformers, capacitors, switching gear and electric cables, which fluids exhibit electrical insulating properties and cooling properties.

Thus, in a first aspect of the present invention there is provided a dielectric fluid composition comprising mono-unsaturated fatty acid-containing oil and alkyl esters.

In one embodiment of the invention, the mono-unsaturated fatty acid-containing oil is a vegetable oil. However, it should be understood that non-vegetable sources of mono-unsaturated fatty acid-containing oil fall within the scope of the present invention, such as animal fat.

Where the mono-unsaturated fatty acid-containing oil is a vegetable oil, in one embodiment of the invention the vegetable oil is selected from the group comprising natural vegetable oil, synthetic vegetable oil, genetically modified vegetable oil, and mixtures thereof.

Where the mono-unsaturated fatty acid-containing oil is a vegetable oil, the vegetable oil is selected from a group comprising castor oil, coconut oil, corn oil, cottonseed oil, linseed oil, olive oil, palm oil, peanut oil, grapeseed oil, canola oil, safflower oil, sunflower oil, and soybean oil, high oleic variants thereof, and mixtures thereof.

The physical and chemical stability of any mono-unsaturated fatty acid-containing oil is determined by its fatty acid content. The term “fatty acid” as used herein refers to a long chain (more than 8-10 carbon atoms) straight- or branched-saturated, mono-unsaturated, or polyunsaturated hydrocarbon chain bonded to a terminal carboxyl group. It will be understood that the term “fatty acid” also encompasses the fatty acid moieties of mono-, di- and tri-glycerides which are the major constituents of vegetable oils.

Saturated fatty acids are stable under mild oxidative conditions, whereas mono-unsaturated and, even more so polyunsaturated fatty acids, are susceptible to oxidation. The melting point of saturated fatty acids increases with chain length such that decanoic and longer chain saturated fatty acids are solids at ambient temperature. While it is also true that the melting point of mono-unsaturated and polyunsaturated fatty acids increases with chain length, the rise in melting point tends to be tempered by an increase in the degree of unsaturation throughout the chain length of the fatty acids or the extent of branching throughout the chain length of the fatty acids.

The physical and chemical stability of a dielectric fluid over prolonged periods of use is an important performance requirement. Thus, in one embodiment of the present invention the mono-unsaturated fatty acid-containing oil comprises a high mono-unsaturated fatty acid content. Typically, the mono-unsaturated fatty acid content is >60%. In some forms of the invention, the mono-unsaturated fatty acid content is >65%. In some forms of the invention, the mono-unsaturated fatty acid content is >70%. In some forms of the invention, the mono-unsaturated fatty acid content is >75%. In one particular embodiment of the invention the mono-unsaturated fatty acid-containing oil comprises about 80% mono-unsaturated fatty acid content. In some forms of the invention, the mono-unsaturated fatty acid content is >80%.

The high mono-unsaturated fatty acid content of the mono-unsaturated fatty acid-containing oil may occur naturally or may be artificially enhanced. For example, a mono-unsaturated fatty acid-containing oil mono-unsaturated fatty acid content may be enriched with mono-unsaturated fatty acid or an oil containing high quantities of such, or the concentration of the mono-unsaturated fatty acid increased by removal of other components from the mono-unsaturated fatty acid-containing oil, or non-mono-unsaturated fatty acid components of the oil may be chemically converted to monounsaturated fatty acid.

The most common mono-unsaturated fatty acid found in vegetable oil is oleic acid. It is found in many naturally occurring vegetable oils, such as sunflower, olive and safflower oil in relatively high proportions. Genetic modification of certain oil seed stocks, such as canola and sunflower, can generate vegetable oils with an oleic acid content of above 80%. Accordingly, in a preferred embodiment of the invention the mono-unsaturated fatty acid-containing oil comprises a high oleic acid content. Typically, the oleic acid content is >60%. In some forms of the invention, the oleic acid content is >65%. In some forms of the invention, the oleic acid content is >70%. In some forms of the invention, the oleic acid content is >75%.

In one of the embodiments of the invention the mono-unsaturated fatty acid-containing oil is a high oleic sunflower oil (HOSO) with 80% oleic acid and <3% linoleic acid.

In one embodiment of the invention the alkyl ester comprises one or more fatty acid alkyl esters. Typically, the alkyl moiety has 1 to 4 carbon atoms. In one embodiment of the invention the alkyl ester comprises one or more fatty acid methyl esters or fatty acid ethyl esters.

The fatty acid alkyl esters are organic compounds formed by an esterification or transesterification reaction between alcohols of 1 to 4 carbon atoms and fatty acids. In one embodiment of the invention the fatty acids are selected from a group comprising saturated fatty acids, mono-unsaturated fatty acids, poly-unsaturated fatty acids, and mixtures thereof. Suitable examples of saturated fatty acids include, but are not limited to, butyric, valeric, caproic, caprylic, pelargonic, capric, lauric, myristic, palmitic, margaric, stearic, arachidic, behenic, lignoceric, cerotic, carboceric, montanic, melissic, lacceoic, psyllic. Suitable examples of mono-unsaturated fatty acids include, but are not limited to, obtusilic, caproleic, lauroleic, linderic, myristoleic, physeteric, tsuzuic, palmitoleic, petroselinic, oleic, vaccenic, gadoleic, gondoic, cetoleic, erucic, and nervonic. Suitable examples of polyunsaturated fatty acids include, but are not limited to, linoleic, γ-linolenic, dihomo-γ-linolenic, arachidonic, α-linoleic, stearidonic, 7,10,13,16-docosatetraenoic, 4,7,10,13,16-docosapentaenoic, 8,11,14,17-eicosatetraenoic, 5,8,11,14,17-eicosapentaenoic (EPA), 7,10,13,16,19-docosapentaenoic (DPA), 4,7,10,13,16,19-docosahexaenoic (DHA), and 5,8,11-eicosatrienoic (Mead acid).

In one embodiment of the invention, the fatty acid moieties of the fatty acid alkyl esters are substantially homologous with the fatty acid content of the mono-unsaturated fatty acid-containing oil of the dielectric fluid composition.

In another embodiment of the invention, the alkyl esters comprise a high mono-unsaturated fatty acid content. Typically, the alkyl ester comprises above 60% mono-unsaturated fatty acid content. In the preferred embodiment the alkyl ester comprises about 80% mono-unsaturated fatty acid content.

In a further embodiment of the present invention, the alkyl esters comprise fatty acid alkyl esters derived from the mono-unsaturated fatty acid-containing oil of the dielectric fluid composition.

In one embodiment of the invention the dielectric fluid composition comprises mono-unsaturated fatty acid-containing oil in the range of 40-60% v/v, and alkyl esters in the range of 60-40% v/v.

In another embodiment of the invention the dielectric fluid composition further comprises at least one additive, the or each additive being selected from a group comprising anti-oxidants, pour point depressants, corrosion inhibitors, anti-bacterials, viscosity modifiers. Suitable examples of anti-oxidant additives comprise metal deactivators.

The mono-unsaturated fatty acid-containing oil—based dielectric fluid developed by the inventors has comparable dielectric properties and performance to mineral oil, the standard dielectric fluid currently used in electrical distribution and power equipment, such as transformers, switching gear and electric cables. Existing transformers can be readily retro-filled with the vegetable oil-based dielectric fluid of the present invention and operated under standard conditions.

Accordingly, in a second aspect of the invention there is provided a transformer having a housing which accommodates a transformer core/coil assembly and a dielectric fluid composition surrounding said core/coil assembly, wherein the dielectric fluid composition comprises mono-unsaturated fatty acid-containing oil and alkyl esters.

The inventors have found that the viscosity of the mono-unsaturated fatty acid-containing oil-based dielectric fluid can be conveniently reduced to within acceptable limits (<20 cSt @40° C.), comparable to the viscosity of mineral oil, by blending mono-unsaturated fatty acid-containing oil with alkyl esters, in particular fatty acid alkyl esters.

Thus, in accordance with a third aspect of the invention, there is provided a method of lowering the viscosity of a mono-unsaturated fatty acid-containing oil-based dielectric fluid comprising blending the vegetable oil-based dielectric fluid with alkyl ester.

It will be understood that the volume of alkyl ester blended with the mono-unsaturated fatty acid-containing oil-based dielectric fluid necessary to obtain a desirable viscosity of <20 cSt @40° C. will vary depending on the fatty acid content of the mono-unsaturated fatty acid-containing oil-based dielectric fluid and the viscosity of the alkyl ester. In one embodiment of the invention the mono-unsaturated fatty acid-containing oil-based dielectric fluid is blended with alkyl ester in a ratio of 40:60-60:40.

In a fourth aspect of the invention there is provided a viscosity modifier for mono-unsaturated fatty acid-containing oil-based dielectric fluids comprising alkyl ester.

In one embodiment of the invention the viscosity modifier comprises one or more fatty acid alkyl esters. Typically, the alkyl moiety has 1 to 4 carbon atoms. In one embodiment of the invention the viscosity modifier comprises one or more fatty acid methyl esters or fatty acid ethyl esters.

Typically, the fatty acids are selected from a group comprising saturated fatty acids, mono-unsaturated fatty acids, poly-unsaturated fatty acids, and mixtures thereof. Suitable examples of saturated fatty acids include, but are not limited to, butyric, valeric, caproic, caprylic, pelargonic, capric, lauric, myristic, palmitic, margaric, stearic, arachidic, behenic, lignoceric, cerotic, carboceric, montanic, melissic, lacceoic, psyllic. Suitable examples of mono-unsaturated fatty acids include, but are not limited to, obtusilic, caproleic, lauroleic, linderic, myristoleic, physeteric, tsuzuic, palmitoleic, petroselinic, oleic, vaccenic, gadoleic, gondoic, cetoleic, erucic, and nervonic. Suitable examples of polyunsaturated fatty acids include, but are not limited to, linoleic, γ-linolenic, dihomo-γ-linolenic, arachidonic, α-linoleic, stearidonic, 7,10,13,16-docosatetraenoic, 4,7,10,13,16-docosapentaenoic, 8,11,14,17-eicosatetraenoic, 5,8,11,14,17-eicosapentaenoic (EPA), 7,10,13,16,19-docosapentaenoic (DPA), 4,7,10,13,16,19-docosahexaenoic (DHA), and 5,8,11-eicosatrienoic (Mead acid).

In one embodiment of the invention, the alkyl esters comprise a high mono-unsaturated fatty acid content. Typically, the alkyl ester comprises above 60% mono-unsaturated fatty acid content. In a preferred embodiment the alkyl ester comprises about 80% mono-unsaturated fatty acid content.

In particular, the alkyl ester can be derived from the mono-unsaturated fatty acid-containing oil from which the dielectric fluid is based.

Thus, in a fifth aspect of the invention there is provided a process for producing a dielectric fluid composition comprising the steps of:

a) providing a first volume of mono-unsaturated fatty acid-containing oil and a second volume of mono-unsaturated fatty acid-containing oil;
b) esterifying the first volume of mono-unsaturated fatty acid-containing oil with an alcohol and forming an alkyl ester; and,
c) blending the alkyl ester with the second volume of mono-unsaturated fatty acid-containing oil.

In one embodiment of the invention the mono-unsaturated fatty acid-containing oil is selected from the group comprising natural vegetable oil, synthetic vegetable oil, genetically modified vegetable oil, and mixtures thereof.

In another embodiment the mono-unsaturated fatty acid-containing oil is selected from a group comprising castor oil, coconut oil, corn oil, cottonseed oil, linseed oil, olive oil, palm oil, peanut oil, grapeseed oil, canola oil, safflower oil, sunflower oil, and soybean oil, high oleic variants thereof, and mixtures thereof.

In one embodiment of the present invention the mono-unsaturated fatty acid-containing oil comprises a high mono-unsaturated fatty acid content. Typically, the mono-unsaturated fatty acid content is >60%. In some forms of the invention, the mono-unsaturated fatty acid content is >65%. In some forms of the invention, the mono-unsaturated fatty acid content is >70%. In some forms of the invention, the mono-unsaturated fatty acid content is >75%. In one particular embodiment of the invention the vegetable oil comprises about 80% mono-unsaturated fatty acid content. In some forms of the invention, the mono-unsaturated fatty acid content is >80%.

In a preferred embodiment of the invention the mono-unsaturated fatty acid-containing oil comprises a high oleic acid content.

Typically, the oleic acid content is >60%. In some forms of the invention, the oleic acid content is >65%. In some forms of the invention, the oleic acid content is >70%. In some forms of the invention, the oleic acid content is >75%.

In one of the embodiments of the invention the mono-unsaturated fatty acid-containing oil is a high oleic sunflower oil (HOSO) with 80% oleic acid and <3% linoleic acid. In some forms of the invention, the oleic acid content is >80%.

In some embodiments, step b) of esterifying the first volume of mono-unsaturated fatty acid-containing oil is performed in the presence of a base catalyst. Typical examples of the base catalyst comprise sodium hydroxide, potassium hydroxide, sodium alkoxides, potassium alkoxides, alkali metal alkoxylate catalysts selected from the group consisting of sodium methanolate, sodium ethanolate, sodium propanolate, sodium butanolate, potassium methanolate, potassium ethanolate, potassium propanolate, potassium butanolate and mixtures thereof, triethanolamine, and mixtures thereof.

In other embodiments, step b) of esterifying the first volume of mono-unsaturated fatty acid-containing oil is performed in the presence of an acid catalyst. Typical examples of the acid catalyst comprise inorganic acid catalysts selected from the group consisting of sulfuric acid, phosphoric acid, hydrochloric acid, or mixtures thereof.

Typically the alkyl ester is blended with the second volume of mono-unsaturated fatty acid-containing oil in a percentage volume ratio of 40:60 to 60:40.

In some embodiments of the invention the dielectric fluid composition is further blended with at least one additive, the or each additive being selected from a group comprising anti-oxidants, pour point depressants, corrosion inhibitors, anti-bacterials, viscosity modifiers. Suitable examples of anti-oxidant additives comprise metal deactivators.

The process can further comprise the step of depleting said composition of water and other conductive contaminants such as acid. Typically, purifying the dielectric fluid composition comprises contacting the dielectric fluid composition with an adsorption medium. Suitable adsorption media to remove water include, but are not limited to, chemical desiccants such as silica gel or anhydrous magnesium sulphate, starch or molecular sieves. Suitable adsorption media to remove acid include but are not limited to diatomaceous earth, attapulgite, or Fuller's earth.

In one embodiment, the dielectric fluid composition is contacted with said adsorption media by eluting the dielectric fluid composition through a column of said adsorption media. In a further embodiment, the step of purifying the dielectric fluid composition comprises eluting the dielectric fluid composition through a first adsorption medium and removing water, and then eluting the dielectric fluid composition through a second adsorption medium and removing acid.

In an alternative embodiment, the process comprises the step of purifying the second volume of mono-unsaturated fatty acid-containing oil and the alkyl esters prior to blending the second volume of mono-unsaturated fatty acid-containing oil and the alkyl esters. Typically, purifying the second volume of mono-unsaturated fatty acid-containing oil and the alkyl esters prior to step c) comprises eluting the second volume of mono-unsaturated fatty acid-containing oil and the alkyl esters through respective adsorption media to remove water and acid, respectively.

In the description of the invention and the claims, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

DESCRIPTION OF THE FIGURES

Preferred embodiments, incorporating all aspects of the invention, will now be described by way of example only with reference to the accompanying drawings, in which.

DETAILED DESCRIPTION OF THE PREFERRED EMBODIMENTS OF THE INVENTION

Figure 1:
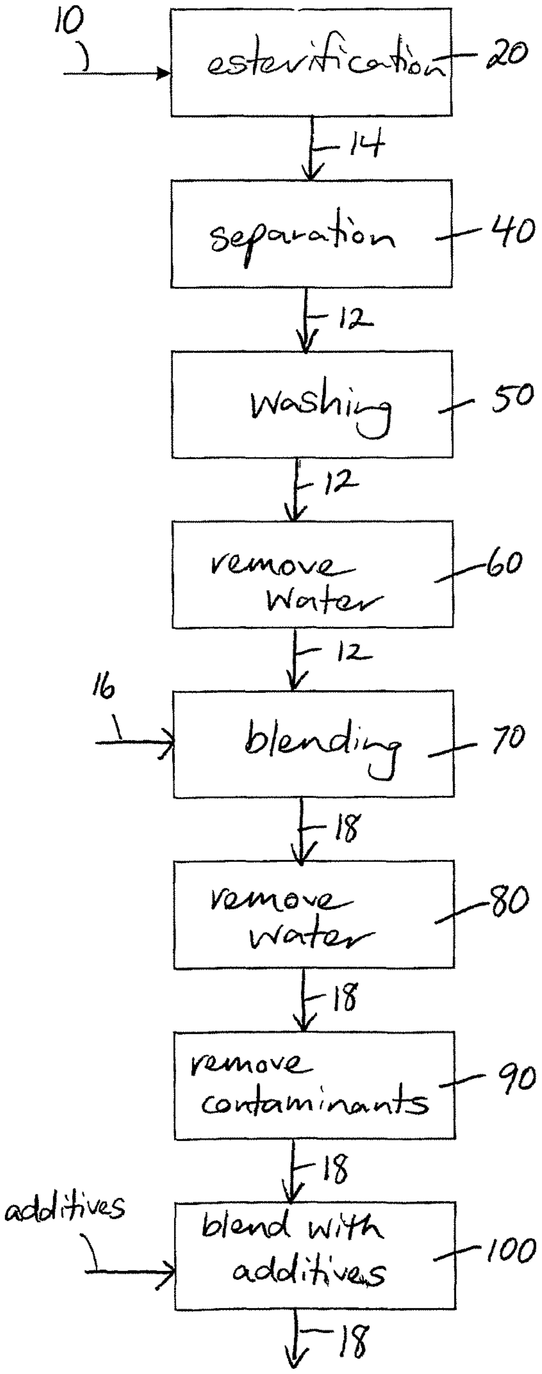
FIG. 1 is a block diagram of a process for producing a dielectric fluid composition in accordance with one aspect of the invention; and, FIG. 2 is a schematic view of a transformer in accordance with another aspect of the invention.

Before the preferred embodiment of the present invention is described, it is understood that this invention is not limited to the particular materials described, as these may vary. It is also to be understood that the terminology used herein is for the purpose of describing the particular embodiment only, and is not intended to limit the scope of the present invention in any way. It must be noted that as used herein, the singular forms "a", "an", and "the" include plural reference unless the context clearly dictates otherwise. Unless defined otherwise, all technical and scientific terms used herein have the same meanings as commonly understood by one of ordinary skill in the art to which this invention belongs.

The present invention provides a dielectric fluid composition comprising a mono-unsaturated fatty acid-containing-oil and alkyl esters.

The mono-unsaturated fatty acid-containing oil is preferably sourced from a renewable source, including plants, animals, fungi, bacteria, etc.

The mono-unsaturated fatty acid-containing oil may be one or more vegetable oils. While the present invention provides for the use of natural vegetable oils, the invention may use synthetic vegetable oils which have the same or similar compositional characteristics as natural vegetable oils, or genetically modified vegetable oils or a mixture thereof. The vegetable oil or vegetable oil blend may also be combined with a minor amount of one or more mineral oils or synthetic oils providing that the resulting blend demonstrates the beneficial properties of the vegetable oil or vegetable oil blend.

Typical examples of vegetable oils suitable for use in the present invention include, but are not limited to, castor oil, coconut oil, corn oil, cottonseed oil, linseed oil, olive oil, palm oil, peanut oil, grapeseed oil, canola oil, safflower oil, sunflower oil, and soybean oil. One particular embodiment of the present invention employs food grade vegetable oil, also referred to as RBD (Refined, Bleached and Deodorised) vegetable oil.

Oxidative stability of mono-unsaturated fatty acid-containing oil is largely determined by the degree of unsaturation in the fatty acid content, while the freezing point of the vegetable oil is determined by chain length, degree of branching and unsaturation. While a vegetable oil with a high saturated fatty acid content will demonstrate chemical stability to oxidation, it will also have a high freezing point. Typically, most fatty acids in vegetable oil have a chain length of between 16-20 carbon atoms. Therefore, a compromise between oxidative stability and freezing point characteristics is achieved by basing the dielectric fluid composition of the present invention on mono-unsaturated fatty acid-containing oils with a high (above 60%) mono-unsaturated fatty acid content. In some forms of the invention, the mono-unsaturated fatty acid content is >65%. In some forms of the invention, the mono-unsaturated fatty acid content is >70%. In some forms of the invention, the mono-unsaturated fatty acid content is >75%.

Preferably, the mono-unsaturated fatty acid-containing oil comprises about 80% mono-unsaturated fatty acid content.

In some forms of the invention, the mono-unsaturated fatty acid content is >80%.

The most common mono-unsaturated fatty acid found in vegetable oil is oleic acid, although other renewable sources of mono-unsaturated fatty acid-containing oils containing oleic acid exist. Mono-unsaturated fatty acid-containing oils in the form with a high oleic acid content are particularly suitable for use in the present invention.

Typically, the oleic acid content is >60%. In some forms of the invention, the oleic acid content is >65%. In some forms of the invention, the oleic acid content is >70%. In some forms of the invention, the oleic acid content is >75%.

One embodiment of the present invention as herein described employs high oleic sunflower oil (HOSO) with 80% oleic acid level and <3% linolenic acid. This particular oil has the following fatty acid composition: 81% monounsaturated fatty acid content, 11% saturated fatty acid content, and 8% polyunsaturated fatty acid content.

The alkyl ester employed in the dielectric fluid composition of the present invention comprises one or more fatty acid alkyl esters. Typically, the alkyl moiety has 1 to 4 carbon atoms. Generally, the most commonly available alkyl esters of fatty acids are produced by esterification or transesterification of mono-unsaturated fatty acid-containing oil and other lipids with methanol or ethanol. In one embodiment of the invention the alkyl ester comprises one or more fatty acid methyl esters or fatty acid ethyl esters.

The fatty acid moieties of the fatty acid alkyl esters are selected from a group comprising saturated fatty acids, mono-unsaturated fatty acids, poly-unsaturated fatty acids, and mixtures thereof. Suitable examples of saturated fatty acids include, but are not limited to, butyric, valeric, caproic, caprylic, pelargonic, capric, lauric, myristic, palmitic, margaric, stearic, arachidic, behenic, lignoceric, cerotic, carboceric, montanic, melissic, lacceoic, psyllic. Suitable examples of mono-unsaturated fatty acids include, but are not limited to, obtusilic, caproleic, lauroleic, linderic, myristoleic, physeteric, tsuzuic, palmitoleic, petroselinic, oleic, vaccenic, gadoleic, gondoic, cetoleic, erucic, and nervonic. Suitable examples of polyunsaturated fatty acids include, but are not limited to, linoleic, γ-linolenic, dihomo-γ-linolenic, arachidonic, α-linoleic, stearidonic, 7,10,13,16-docosatetraenoic, 4,7,10,13,16-docosapentaenoic, 8,11,14,17-eicosatetraenoic, 5,8,11,14,17-eicosapentaenoic (EPA), 7,10,13,16,19-docosapentaenoic (DPA), 4,7,10,13,16,19-docosahexaenoic (DHA), and 5,8,11-eicosatrienoic (Mead acid).

Typically, the viscosity of most fatty acid alkyl esters, regardless of the degree of unsaturation in the fatty acid moiety, fall in a range of about 2-6 cSt @40° C. While it will be understood that fatty acid alkyl esters with any one of the above fatty acid moieties will be suitable for employment as a viscosity modifier for a dielectric fluid or as a component in the dielectric fluid composition in accordance with the present invention, a high mono-unsaturated fatty acid content is preferred to provide better chemical stability of the viscosity modifier and/or the dielectric fluid composition containing said alkyl esters against oxidation.

Typically, sufficient chemical stability against oxidation is provided when the alkyl ester comprises above 60% mono-unsaturated fatty acid content. In some forms of the invention, the alkyl ester comprises above 65%. In some forms of the invention, the alkyl ester comprises above 70%. In some forms of the invention, the alkyl ester comprises above 75%.

In the preferred embodiment the alkyl ester comprises about 80% mono-unsaturated fatty acid content. Accordingly, the alkyl esters employed in the present invention can be readily derived from high oleic mono-unsaturated fatty acid-containing oil which have a high concentration of mono-unsaturated fatty acids.

In one embodiment of the invention, the fatty acid moieties of the fatty acid alkyl esters are substantially homologous with the fatty acid content of the mono-unsaturated fatty acid-containing oil of the dielectric fluid composition.

To ensure that the alkyl esters in the dielectric fluid composition conform to a similar or the same fatty acid content as the mono-unsaturated fatty acid-containing oil, the alkyl esters may be conveniently derived from the mono-unsaturated fatty acid-containing oil of the dielectric fluid composition by subjecting the mono-unsaturated fatty acid-containing oil to esterification or transesterification with the preferred alcohol.

Notwithstanding the preferred embodiment described above, it will also be understood that the alkyl esters employed by the present invention as the viscosity modifier and as one of the components of the dielectric fluid composition may be derived from other sources of fatty acids, including vegetable- or animal-based lipids, such as fats and tallows.

Typically the dielectric fluid composition comprises mono-unsaturated fatty acid-containing oil in the range of 40-60% v/v, and alkyl esters in the range of 60-40% v/v.

It will be understood that the dielectric fluid composition further comprises at least one additive to improve or further enhance the dielectric properties and characteristics of the dielectric fluid composition of the present invention.

The pour point of the dielectric fluid composition can be improved either by addition of pour point suppressants to the dielectric fluid composition or winterization of the dielectric fluid composition. The pour point depressant typically contains a branched polymethacrylate backbone which encourages inclusion of the pour point depressant molecule into a growing crystal of the vegetable oil in the dielectric fluid composition. By interfering with wax crystal growth patterns, the pour point depressant increases the operational range of the dielectric fluid composition so it remains fluid at much lower temperatures. Pour point depressants such as Viscoplex® 10-310, Viscoplex® 10-930, and Viscoplex® 10-950 are suitable examples.

Winterization is the process of removing sediment which appears in vegetable oils at low temperatures. The sedimentation is accompanied with a decrease in the oil's viscosity. Winterization of the dielectric fluid composition is typically performed by slow cooling the dielectric fluid composition to 7° C., then filtering any resulting crystals. The liquid filtrate subsequently undergoes another period of slow cooling in a manner as described above to remove any additional resulting crystals.

The oxidative stability of the dielectric fluid composition can also be improved by addition of anti-oxidants and/or metal deactivators to the dielectric fluid composition. Suitable examples of anti-oxidants include, but are not limited to, phenolic anti-oxidants such as Igranox® L109, Igranox® L64, Igranox® L94, and octylated/butylated diphenylamine antioxidants such as Igranox® L57. Typically, the dielectric fluid composition comprises less than 1.5% anti-oxidant. Suitable examples of metal deactivators include, but are not limited to, copper deactivators such as benzotriazole and triazole derivatives. Typically, the dielectric fluid composition comprises less than 0.7% metal deactivator.

While it is envisaged that food grade vegetable oil may be employed as the mono-unsaturated fatty acid-containing oil component of the dielectric fluid composition of the present invention, it is acknowledged that food grade vegetable oil, also referred to as RBD (Refined, Bleached and Deodorised) vegetable oil is typically unsatisfactory for use as a dielectric fluid as it contains water and other conductive contaminants which degrade its performance properties as a dielectric fluid when used in electrical apparatus such as power and distribution transformers. For example, in respect to HOSO, the dielectric breakdown voltage is typically >55 kV (IEC 156, 2 mm gap electrode), dielectric dissipation factor <0.085 at 90° C. and 50 HZ (IEC 247), initial acidity number <0.12 mg KOH/g (IEC 296), initial surface tension (IFT)>21.0 dynes/cm (ISO 6295), pour point<−15° C. (ISO 3016), and a moisture content >380 ppm. These values are outside of acceptable dielectric performance.

Additionally, for many of the same reasons, the dielectric properties of alkyl esters of the present invention are typically unsatisfactory for use as a dielectric fluid.

Accordingly, it will be understood that although the dielectric fluid composition of the present invention comprises mono-unsaturated fatty acid-containing oil and alkyl esters, typically the dielectric fluid composition will need to undergo one or more purification processes in order to render the dielectric fluid composition with the necessary performance characteristics comparable to existing mineral oil-based dielectric fluids.

In one embodiment of the invention the dielectric fluid composition is purified to remove water and other polar contaminants. Removal of water is effected with known dehydration processes. Suitable examples of dehydration processes include but are not limited to eluting the dielectric fluid composition under gravity through adsorption media such as molecular sieves, starches, and desiccants, centrifugal separation, and vacuum dehydration. Typically, the dehydration process employed in the present invention decreases the water content of the dielectric fluid composition by more than 70%, preferably more than 80%.

Removal of polar contaminants is typically accomplished by eluting the dielectric fluid composition under gravity through adsorption media including but not limited to Fuller's earth, activated clays, and attapulgite. Typically, elution of the dielectric fluid composition through the above described adsorption media decreases the acid value of the dielectric fluid composition and increases the interfacial tension of the dielectric fluid composition to acceptable parameters. It will be understood that the above described process may be conducted one or more times, depending on the original acid value and interfacial tension of the mono-unsaturated fatty acid-containing oil.

Preferably, the dielectric fluid composition is dehydrated prior to treatment with adsorption media for removal of polar contaminants.

Advantageously, it has been found that sequential treatment of the dielectric fluid composition with the desiccant followed by elution through the adsorption media is an effective method for also significantly improving the dielectric voltage and dissipation factors of the dielectric fluid composition such that after said treatment these parameters fall within acceptable standards for dielectric fluids.

Alternatively, the mono-unsaturated fatty acid-containing oil and the alkyl esters can be separately purified by the processes described above prior to blending the mono-unsaturated fatty acid-containing oil and the alkyl esters to afford the dielectric fluid composition of the present invention.

In a specific form, the invention comprises a dielectric fluid composition comprising:

an oil of a high mono-unsaturated fatty acid content; and one or more fatty acid alkyl esters, each having a fatty acid moiety and an alkyl moiety, wherein the alkyl moiety of the fatty acid alkyl esters has 1 to 4 carbon atoms; and wherein the oil is in the range of 40%-60% v/v of the dielectric fluid composition and the fatty acid alkyl ester is in the range of 40%-60% v/v of the dielectric fluid composition.

In one form of the invention, the mono-unsaturated fatty acid content of the oil is >60%. In one form of the invention, the mono-unsaturated fatty acid content of the oil is >65%. In one form of the invention, the mono-unsaturated fatty acid content of the oil is >70%. In one form of the invention, the mono-unsaturated fatty acid content of the oil is >75%. In one form of the invention, the mono-unsaturated fatty acid content of the oil is about 80%. In one form of the invention, the mono-unsaturated fatty acid content of the oil is >80%

The oil may be selected from the group comprising: natural vegetable oil, synthetic vegetable oil, genetically modified vegetable oil, animal fat (tallow), non-vegetable oils, fungally derived oil and mixtures thereof.

The oil is selected from a group comprising: castor oil, coconut oil, corn oil, cottonseed oil, linseed oil, olive oil, palm oil, peanut oil, grapeseed oil, canola oil, safflower oil, sunflower oil, and soybean oil, high oleic variants thereof, and mixtures thereof.

The monounsaturated fatty acid is one or more of the group: obtusilic, caproleic, lauroleic, linderic, myristoleic, physeteric, tsuzuic, palmitoleic, petroselinic, oleic, vaccenic, gadoleic, gondoic, cetoleic, erucic, and nervonic acids.

Preferably, the oil comprises a high oleic acid content. In one form the oleic acid content of the vegetable oil is >60%. In one form the oleic acid content of the oil is >65%. In one form, the oleic acid content of the oil is >70%. In one form, the oleic acid content of the oil is >75%. In one form, the oleic acid content of the oil is about 80%. In one form, the oleic acid content of oil is >80%

In a preferred form of the invention, the oil is a high oleic sunflower oil (HOSO) with 80% oleic acid and <3% linoleic acid, olive oil with 75% or more oleic acid, high oleic soybean oil with 80% or more oleic acid, high oleic canola oil with 70% or more oleic oil, high oleic safflower oil with 75% or more oleic oil.

Preferably, the alkyl moiety of the or each fatty acid alkyl ester has 1 to 2 carbon atoms.

The fatty acid alkyl ester may comprise one or more monounsaturated fatty acid esters.

The fatty acid alkyl ester may comprise one or more esters of one or more monounsaturated fatty acids selected from the following group: obtusilic, caproleic, lauroleic, linderic, myristoleic, physeteric, tsuzuic, palmitoleic, petroselinic, oleic, vaccenic, gadoleic, gondoic, cetoleic, erucic, and nervonic acids.

The fatty acid moieties of the fatty acid alkyl esters may be substantially homologous with the monounsaturated fatty acid content of the oil of the dielectric fluid composition.

In one form of the invention, above 60% of the fatty acid moieties of the fatty acid alkyl esters is derived from one or more mono-unsaturated fatty acids In one form of the invention about 80% of the fatty acid moieties of the fatty acid alkyl esters is derived from one or more mono-unsaturated fatty acids.

In one form of the invention the fatty acid alkyl esters comprise fatty acid alkyl esters derived from the oil of the dielectric fluid composition.

In one form of the invention the dielectric fluid composition further comprises at least one additive, the or each additive being selected from a group comprising anti-oxidants, pour point depressants, corrosion inhibitors, anti-bacterials, viscosity modifiers.

The anti-oxidant additives may comprise metal deactivators.

In a preferred form of the invention, the dielectric fluid composition has a viscosity of <20 cSt at 40° C.

The present invention further provides a dielectric fluid composition comprising:

an oil containing at least one mono-unsaturated fatty acid; and one or more fatty acid alkyl esters, each having a fatty acid moiety and an alkyl moiety, wherein the alkyl moiety of the fatty acid alkyl esters has 1 to 4 carbon atoms; and wherein the oil is in the range of 40%-60% v/v of the dielectric fluid composition and the a fatty acid alkyl ester is in the range of 40%-60% v/v of the dielectric fluid composition, wherein the viscosity of the dielectric solution is <20 cSt at 40° C.

In one form, the viscosity of the composition is <19 cSt at 40° C. In one form, the viscosity of the composition is <18 cSt at 40° C. In one form, the viscosity of the composition is <17 cSt at 40° C. In one form, the viscosity of the composition is <16 cSt at 40° C. In one form, the viscosity of the composition is between 1 and 20 cSt at 40° C. In one form, the viscosity of the composition is between 1 and 19 cSt at 40° C. In one form, the viscosity of the composition is between 1 and 18 cSt at 40° C. In one form, the viscosity of the composition is between 1 and 17 cSt at 40° C. In one form, the viscosity of the composition is between 1 and 16 cSt at 40° C.

The present invention further provides a method of lowering the viscosity of an oil-based dielectric fluid comprising an oil comprising a high mono-unsaturated fatty acid content comprising blending the vegetable oil-based dielectric fluid with one or more fatty acid alkyl esters wherein the alkyl moiety of the fatty acid alkyl ester has 1 to 4 carbon atoms, and wherein the vegetable oil based dielectric fluid is blended with the fatty acid alkyl esters in a ratio of 40:60-60:40.

In one form, the mono-unsaturated fatty acid content of the oil is >65%. In one form, the mono-unsaturated fatty acid content of the oil is >70%. In one form, the mono-unsaturated fatty acid content of the oil is >75%. In one form, mono-unsaturated fatty acid content of the oil is about 80%. In one form, mono-unsaturated fatty acid content of the oil is >80%

Preferably, the volume of fatty acid alkyl esters blended with the vegetable oil-based dielectric fluid is sufficient to obtain a viscosity of <20 cSt @40° C.

The volume of fatty acid alkyl esters blended with the vegetable oil-based dielectric fluid may be sufficient to obtain a viscosity of <19 cSt at 40° C. The volume of fatty acid alkyl esters blended with the vegetable oil-based dielectric fluid may be sufficient to obtain a viscosity of <18 cSt at 40° C. The volume of fatty acid alkyl esters blended with the vegetable oil-based dielectric fluid may be sufficient to obtain a viscosity of <17 cSt at 40° C., The volume of fatty acid alkyl esters blended with the vegetable oil-based dielectric fluid may be sufficient to obtain a viscosity of <16 cSt at 40° C.

The volume of fatty acid alkyl esters blended with the vegetable oil-based dielectric fluid may be sufficient to obtain a viscosity of between 1 and 20 cSt at 40° C. The volume of fatty acid alkyl esters blended with the vegetable oil-based dielectric fluid may be sufficient to obtain a viscosity of between 1 and 19 cSt at 40° C. The volume of fatty acid alkyl esters blended with the vegetable oil-based dielectric fluid may be sufficient to obtain a viscosity of between 1 and 18 cSt at 40° C. The volume of fatty acid alkyl esters blended with the vegetable oil-based dielectric fluid may be sufficient to obtain a viscosity of between 1 and 17 cSt at 40° C. The volume of fatty acid alkyl esters blended with the vegetable oil-based dielectric fluid may be sufficient to obtain a viscosity of between 1 and 16 cSt at 40° C.

The present invention further provides a viscosity modifier for oil-based dielectric fluids having a high mono-unsaturated fatty acid content, the viscosity modifier comprising one or more fatty acid alkyl esters, having an alkyl moiety and a fatty acid moiety, wherein the alkyl moiety has 1 to 4 carbon atoms.

Preferably, the alkyl moiety of the fatty acid alky ester has 1 or 2 carbon atoms.

In one form, the fatty acid moiety of the fatty acid alkyl ester is derived from one or more mono-unsaturated fatty acids.

In one form of the invention, the mono-unsaturated fatty acids are selected from a group comprising: obtusilic, caproleic, lauroleic, linderic, myristoleic, physeteric, tsuzuic, palmitoleic, petroselinic, oleic, vaccenic, gadoleic, gondoic, cetoleic, erucic, and nervonic.

Preferably, above 60% of the fatty acid moieties of the fatty acid alkyl ester is derived from one or more mono-unsaturated fatty acids.

In a specific form, about 80% of the fatty acid moieties of the fatty acid alkyl ester is derived from one or more mono-unsaturated fatty acids.

In a convenient form of the invention, the fatty acid alkyl ester is derived from the oil from which the dielectric fluid is based.

The present invention further provides a process for producing a dielectric fluid composition comprising the steps of:

a) providing a first volume of an oil and a second volume of an oil, the oil being of a high mono-unsaturated fatty acid content;
b) esterifying the first volume of oil with an alcohol containing 1 to 4 carbon atoms and forming a fatty acid alkyl ester; and
c) blending the fatty acid alkyl ester with the second volume of oil in a ratio of 40:60-60:40.

The oil may be selected from the group comprising natural vegetable oil, synthetic vegetable oil, genetically modified vegetable oil, and mixtures thereof.

Of course, it should be understood that the oils of the present invention are not limited to vegetable oils.

In one form of the invention, the oil may be selected from a group comprising castor oil, coconut oil, corn oil, cottonseed oil, linseed oil, olive oil, palm oil, peanut oil, grapeseed oil, canola oil, safflower oil, sunflower oil, and soybean oil, high oleic variants thereof, and mixtures thereof.

In one form of the invention, the mono-unsaturated fatty acid content of the oil is >60%. In one form of the invention, the mono-unsaturated fatty acid content of the oil is >65%. In one form of the invention, the mono-unsaturated fatty acid content of the oil is >70%. In one form of the invention, the mono-unsaturated fatty acid content of the oil is >75%. In one form of the invention, the mono-unsaturated fatty acid content of the oil is about 80%. In one form of the invention, the mono-unsaturated fatty acid content of the oil is >80%.

In one form of the invention, the oil comprises a high oleic acid content. In one form of the invention, the oleic acid content of the oil is >60%. In one form of the invention, the oleic acid content of the oil is >65%.

In one form of the invention, the oleic acid content of the oil is >70%. In one form of the invention, the oleic acid content of the oil is >75%. In one form of the invention, the oleic acid content of the oil is about 80%. In one form of the invention, the oleic acid content of the oil is >80%.

In one form of the invention, the oil is a high oleic sunflower oil (HOSO) with 80% oleic acid and <3% linoleic acid.

The step b) of esterifying the first volume of oil may be performed in the presence of a base catalyst.

The base catalyst may be selected from a group comprising: sodium hydroxide, potassium hydroxide, sodium alkoxides, potassium alkoxides, alkali metal alkoxylate catalysts selected from the group consisting of sodium methanolate, sodium ethanolate, sodium propanolate, sodium butanolate, potassium methanolate, potassium ethanolate, potassium propanolate, potassium butanolate and mixtures thereof, triethanolamine.

Alternately, the step b) of esterifying the first volume of oil may be performed in the presence of an acid catalyst.

The acid catalyst may be an inorganic acid catalyst and may be selected from the group consisting of sulfuric acid, phosphoric acid, hydrochloric acid, or mixtures thereof.

The dielectric fluid composition may be further blended with at least one additive, the or each additive being selected from a group comprising anti-oxidants, pour point depressants, corrosion inhibitors, anti-bacterials, viscosity modifiers.

The process may further comprise the step of depleting said composition of water and other conductive contaminants such as acid.

The step of depleting said composition comprises contacting the dielectric fluid composition with adsorption media.

The adsorption media to remove water may be selected from a group comprising chemical desiccants such as silica gel or anhydrous magnesium sulphate, or molecular sieves.

The adsorption media to remove acid may be selected from a group comprising diatomaceous earth, attapulgite, or Fuller's earth.

The dielectric fluid composition may be contacted with said adsorption media by eluting the dielectric fluid composition through a column of said adsorption media. The step of depleting the dielectric fluid composition of water and contaminants may comprise eluting the dielectric fluid composition through a first adsorption medium and removing water, and then eluting the dielectric fluid composition through a second adsorption medium and removing acid.

In one form, the process further comprises the step of depleting the second volume of oil and the alkyl esters of water and other conductive contaminants such as acid, prior to blending the second volume of oil with the alkyl esters.

In one form, the second volume of oil and the alkyl esters are separately eluted through respective first adsorption media to remove water, and then separately eluted through respective second adsorption media to remove acid.

The present invention further provides the use of a composition comprising:

- an oil of a high mono-unsaturated fatty acid content; and
- one or more fatty acid alkyl esters, each having a fatty acid moiety and an alkyl moiety, wherein the alkyl moiety of the fatty acid alkyl esters has 1 to 4 carbon atoms; and
- wherein the oil is in the range of 40%-60% v/v of the dielectric fluid composition and the a fatty acid alkyl ester is in the range of 40%-60% v/v of the dielectric fluid composition as a dielectric fluid.

The present invention further provides the use of a composition comprising:

- an oil of a high mono-unsaturated fatty acid content; and
- one or more fatty acid alkyl esters, each having a fatty acid moiety and an alkyl moiety, wherein the alkyl moiety of the fatty acid alkyl esters has 1 to 4 carbon atoms; and
- wherein the oil is in the range of 40%-60% v/v of the dielectric fluid composition and the a fatty acid alkyl ester is in the range of 40%-60% v/v of the dielectric fluid composition, and the viscosity of the composition is <20 cSt at 40° C., as a dielectric fluid.

The present invention further comprises a dielectric fluid composition comprising:

- a non-vegetable oil of a high mono-unsaturated fatty acid content; and
- one or more fatty acid alkyl esters, each having a fatty acid moiety and an alkyl moiety, wherein the alkyl moiety of the fatty acid alkyl esters has 1 to 4 carbon atoms; and wherein the non-vegetable oil is in the range of 40%-60% v/v of the dielectric fluid composition and the a fatty acid alkyl ester is in the range of 40%-60% v/v of the dielectric fluid composition.

The mono-unsaturated fatty acid content of the non-vegetable oil may be >60%. The mono-unsaturated fatty acid content of the non-vegetable oil may be >65%. The mono-unsaturated fatty acid content of the non-vegetable oil may be >70%. The mono-unsaturated fatty acid content of the non-vegetable oil may be >75%. The mono-unsaturated fatty acid content of the non-vegetable oil may be about 80%. The mono-unsaturated fatty acid content of the non-vegetable oil may be >80%.

The non-vegetable oil may be selected from the group comprising: animal-derived oil, fungally-derived oil, bacterially-derived oil, synthetic oils and mixtures thereof.

The monounsaturated fatty acid may be one or more of the group: obtusilic, caproleic, lauroleic, linderic, myristoleic, physeteric, tsuzuic, palmitoleic, petroselinic, oleic, vaccenic, gadoleic, gondoic, cetoleic, erucic, and nervonic acids.

In one form of the invention, the non-vegetable oil comprises a high oleic acid content. In one form of the invention, the oleic acid content of the non-vegetable oil is >60%. In one form of the invention, the oleic acid content of the non-vegetable oil is >65%. In one form of the invention, the oleic acid content of the non-vegetable oil is >70%. In one form of the invention, the oleic acid content of the non-vegetable oil is >75%. In one form of the invention, the oleic acid content of the non-vegetable oil is about 80%. In one form of the invention, the oleic acid content of the oil is >80% The alkyl moiety of the or each fatty acid alkyl ester may have 1 to 2 carbon atoms.

The fatty acid alkyl ester may comprise one or more monounsaturated fatty acid esters.

The fatty acid alkyl ester may comprise one or more esters of one or more monounsaturated fatty acids selected from the following group: obtusilic, caproleic, lauroleic, linderic, myristoleic, physeteric, tsuzuic, palmitoleic, petroselinic, oleic, vaccenic, gadoleic, gondoic, cetoleic, erucic, and nervonic acids.

The fatty acid moieties of the fatty acid alkyl esters may be substantially homologous with the monounsaturated fatty acid content of the non-vegetable oil of the dielectric fluid composition.

In one form of the invention, above 60% of the fatty acid moieties of the fatty acid alkyl esters is derived from one or more mono-unsaturated fatty acids In one form of the invention, about 80% of the fatty acid moieties of the fatty acid alkyl esters is derived from one or more mono-unsaturated fatty acids.

In a preferred form of the invention, the fatty acid alkyl esters comprise fatty acid alkyl esters derived from the non-vegetable oil of the dielectric fluid composition.

The dielectric fluid composition may comprise at least one additive, the or each additive being selected from a group comprising anti-oxidants, pour point depressants, corrosion inhibitors, anti-bacterials, viscosity modifiers.

The anti-oxidant additives may comprise metal deactivators.

In one form, the viscosity of the composition is <20 cSt at 40° C. In one form, the viscosity of the composition is <19 cSt at 40° C. In one form, the viscosity of the composition is <18 cSt at 40° C. In one form, the viscosity of the composition is <17 cSt at 40° C. In one form, the viscosity of the composition is <16 cSt at 40° C. In one form, the viscosity of the composition is between 1 and 20 cSt at 40° C. In one form, the viscosity of the composition is between 1 and 19 cSt at 40° C. In one form, the viscosity of the composition is between 1 and 18 cSt at 40° C. In one form, the viscosity of the composition is between 1 and 17 cSt at 40° C. In one form, the viscosity of the composition is between 1 and 16 cSt at 40° C.

The present invention further comprises a dielectric fluid composition comprising:

- a non-vegetable oil containing at least one mono-unsaturated fatty acid; and one or more fatty acid alkyl esters, each having a fatty acid moiety and an alkyl moiety, wherein the alkyl moiety of the fatty acid alkyl esters has 1 to 4 carbon atoms; and wherein the oil is in the range of 40%-60% v/v of the dielectric fluid composition and the a fatty acid alkyl ester is in the range of 40%-60% v/v of the dielectric fluid composition, wherein the viscosity of the dielectric solution is <20 cSt at 40° C.

In one form, the viscosity of the composition is <19 cSt at 40° C. In one form, the viscosity of the composition is <18 cSt at 40° C. In one form, the viscosity of the composition is <17 cSt at 40° C. In one form, the viscosity of the composition is <16 cSt at 40° C. In one form, the viscosity of the composition is between 1 and 20 cSt at 40° C. In one form, the viscosity of the composition is between 1 and 19 cSt at 40° C. In one form, the viscosity of the composition is between 1 and 18 cSt at 40° C. In one form, the viscosity of the composition is between 1 and 17 cSt at 40° C. In one form, the viscosity of the composition is between 1 and 16 cSt at 40° C.

A process for producing a dielectric fluid composition in accordance with one embodiment of the invention will now be described with reference to the flow chart of FIG. 1.

A first volume of vegetable oil 10 is mixed with an alcohol, such as methanol or ethanol, in the presence of a catalyst to esterify 20 the first volume of vegetable oil 10 and form an alkyl ester 12. In some embodiments, the step of esterifying 20 the vegetable oil is performed in the presence of a base catalyst. Typical examples of the base catalyst comprise sodium hydroxide, potassium hydroxide, sodium alkoxides, potassium alkoxides, alkali metal alkoxylate catalysts selected from the group consisting of sodium methanolate, sodium ethanolate, sodium propanolate, sodium butanolate, potassium methanolate, potassium ethanolate, potassium propanolate, potassium butanolate and mixtures thereof, triethanolamine, and mixtures thereof.

Alternatively, the step of esterifying 20 the vegetable oil 10 is performed in the presence of an acid catalyst. Typical examples of the acid catalyst comprise inorganic acid catalysts selected from the group consisting of sulfuric acid, phosphoric acid, hydrochloric acid, or mixtures thereof.

After completion of the esterification reaction, the mixture 14 of reaction products, largely alkyl esters 12 and glycerine, unreacted reactants, including the alcohol containing the catalyst, and other byproducts, are separated 30. Glycerine is typically separated 40 from the alkyl esters 12 by gravity or centrifugal separation techniques well known in the art. Excess alcohol can be removed by distillation or evaporation under reduced pressure.

The separated alkyl esters typically contain entrained catalyst which can be removed by one or more washes 50 with water, followed by removal 60 of the water by decanting and/or centrifugal separation techniques and/or vacuum filtration.

A second volume of vegetable oil 16 is then blended 70 with the resulting alkyl esters 12 in a ratio of 40:60-60:40 volume percent to provide the dielectric fluid composition 18 of the present invention. It will be understood that the volume of alkyl ester 12 blended with the second volume of vegetable oil 16 is sufficient to obtain a viscosity of <20 cSt @40° C.

The dielectric fluid composition 18 is then treated to remove water 80 therefrom by the above described techniques, and then subsequently treated to remove 90 contaminants therefrom, such as acid. One or more additives to improve the dielectric performance of the composition 18, as described above, may then be blended 100 with the composition 18.

The inventors have identified that the dielectric fluid composition of the present invention is miscible with current mineral oil-based dielectric fluids. Therefore, the composition may be conveniently retro-filled in electrical distribution and power equipment, in particular transformers, switching gear and electric cables, which are currently operated with mineral oil-based dielectric fluids.

Figure 2:
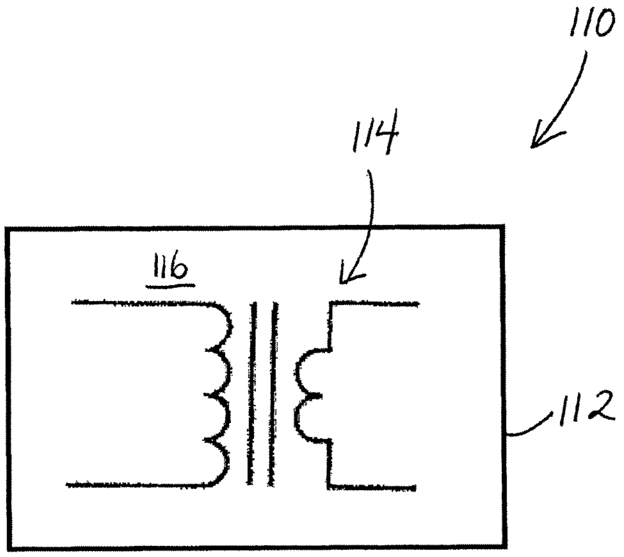

Referring to FIG. 2, there is shown a transformer 110 having a housing 112 which accommodates a transformer core/coil assembly 114. The transformer core-coil assembly 114 is arranged to be immersed in a dielectric fluid composition 116 of the present invention, such that the dielectric fluid composition 116 surrounds the transformer core-coil assembly 114 and performs according to desired electrical standards.

The following example illustrates, but does not limit, the invention by describing a preferred embodiment.

EXAMPLE

Esterification of Vegetable Oil to Provide Alkyl Ester

An RBD food grade vegetable oil comprising high oleic sunflower oil (HOSO) with 80% oleic acid level and <3% linolenic acid and the following fatty acid composition: 81% mono-unsaturated fatty acids, 11% saturated fatty acids, 8% polyunsaturated fatty acids was esterified with ethanol under base-catalysed conditions.

Analytical grade ethanol (27.4 ml) and potassium hydroxide (1.3 g) were first vigorously mixed together and added to HOSO (100 ml). The mixture was stirred for six hours then allowed to remain undisturbed over night to enable complete separation of the alkyl esters from a glycerol byproduct and sludge-like contaminants at the base of the reaction flask.

On certain occasions an emulsion formed in the alkyl ester layer which prevented ready separation of the alkyl ester from the glycerol byproduct. The emulsion may be broken up by heating the reaction mixture to about 80° C. or by adding a small amount of glacial acetic acid (10 ml/L of vegetable oil) to the mixture.

Alternatively, the emulsion may be broken up by vigorously stirring the mixture for 20 minutes, adding water (15 ml/L of vegetable oil) to the mixture, and vigorously stirring the mixture for a further 20 minutes.

Upon separation into an alkyl ester layer and a glycerol layer, the alkyl ester was slowly decanted and washed with water (50% v/v) three times. The alkyl ester was then dried with desiccants and/or under vacuum to remove water and residual ethanol.

Typically, the viscosity of the alkyl ester derived from HOSO as described above is 6 cSt, whereas the viscosity of HOSO is 43 cSt.

Dielectric Fluid Composition

The dielectric properties of original RBD HOSO are as follows: dielectric breakdown voltage >55 kV (IEC156, 2 mm gap electrode), dielectric dissipation factor <0.085 at 90° C. and 50 HZ (IEC 247), initial acidity number <0.12 mg KOH/g (IEC 296), initial surface tension (IFT)>21.0 dynes/cm (ISO 6295), pour point<−15° C. (ISO 3016), and $H_2O$ >380 ppm.

The alkyl ester prepared as described above was then blended with RBD HOSO in accordance with the following compositions:

Blend 1: 100% RBD HOSO
Blend 2: 40% alkyl ester and 60% RBD HOSO
Blend 3: 50% alkyl ester and 50% RBD HOSO
Blend 4: 70% alkyl ester and 30% RBD HOSO
Blend 5: 100% alkyl ester Table 1 shows the physical, thermal, chemical and electrical properties of the above blends.

TABLE 1

| Characteristics of different blends of alkyl esters and HOSO | | | | | | |
|---|---|---|---|---|---|---|
| Parameter | Test Method | Blend 1 | Blend 2 | Blend 3 | Blend 4 | Blend 5 |
| Flash point ° C. | ISO 2719 | 320 | | | | |
| Pour Point ° C. | ISO 3016 | −18 | | | | |
| Acid Value mg KOH/g | IEC 296 | 0.010 | 0.010 | 0.015 | 0.015 | 0.030 |
| Kinematic Viscosity @ 40° C. cSt | ISO 3104 | 43 | 19 | 15 | 10 | 6 |
| Dielectric Strength kV | IEC 156 | 75 | 75 | 75 | 75 | 70 |
| Dissipation factor, at 90° C. and 40 Hz | IEC 247 | 0.015 | 0.035 | 0.040 | 0.045 | 0.050 |
| Water content (mg/kg) | IEC 733 | 65 | 70 | 75 | 85 | 100 |
| IFT (dynes/cm) at 25° C. | ISO 6295 | 28.5 | 28.5 | 28.5 | 28.0 | 27.0 |
| Biodegradability (%) | CEC-L33A94 | >95 | >95 | >95 | >95 | >95 |

Typically, the dielectric fluid composition of the present invention is a low viscous dielectric fluid with electrical properties within the acceptable range of typical dielectric fluids used in power and distribution transformers. For example, a typical dielectric fluid demonstrates a dielectric breakdown voltage of at least 70 kV (IEC 156-2.5 mm gap electrode), dissipation factor of less than 0.04 at 90° C. and 50 Hz (IEC 247), acidity or neutralisation value is less than 0.02 mg KOH/g oil (IEC 296), moisture content of less than 80 ppm (Karl-Fischer), viscosity of less than 16 cSt at 40° C. (ISO 3104), flash point of at least 250° C. (ISO 2719) and pour point of at least −15° C. (ISO 3016).

The low viscous vegetable oil-based dielectric fluid composition of the present invention has a viscosity value less than or equal to 20 cSt, preferably less than or equal to 15 cSt.

Blends 2-5 demonstrate a viscosity less than or equal to 20 cSt, and blends 3-5 demonstrate a viscosity less than or equal to 15 cSt. However, it is thought that blends 4 and 5 may have a flash point which is too high for the blend to be safely used as a dielectric fluid composition. Thus, blend 3 was selected for further investigation as to its desirable properties as a dielectric fluid composition.

Table 2 shows the physical, thermal, chemical and electrical properties of Blend 3 prior to undergoing purification treatment, a typical mineral oil for purposes of comparison, and the permissible values for a dielectric fluid for transformers.

TABLE 2

| Thermal, physical, chemical, electrical and biodegradation characteristics of Blend 3, mineral oil, and permissible values for dielectric fluids used in transformers. | | | | |
|---|---|---|---|---|
| Characteristics | Test Method | Test Value of 50:50 Blend | Typical Mineral Oil Value | Permissible values for measured characteristics |
| Physical Test: | | | | |
| Viscosity @ 40° C. cSt, maximum | ISO 3104 | 15.3 | 10 | ≦16.5 |
| Moisture Content, ppm, maximum* | IEC 733 | 380 | 10-30 | ≦30 |
| Chemical Test | | | | |
| Acid Value mg KOH/g, maximum | IEC 296 | 0.10 | 0.01 | ≦0.03 |
| IFT dynes/cm minimum | ISO 6295 | 21.0 | 40 | ≧40 |
| Electrical Test | | | | |
| Dielectric Strength kV, minimum | IEC 156 | 50.0 | 70 | ≧50 |
| Dissipation Factor @ 90° C., maximum | IEC 247 | 0.090 | 0.001 | ≦0.01 |

TABLE 2-continued

Thermal, physical, chemical, electrical and biodegradation characteristics of Blend 3, mineral oil, and permissible values for dielectric fluids used in transformers.

| Characteristics | Test Method | Test Value of 50:50 Blend | Typical Mineral Oil Value | Permissible values for measured characteristics |
|---|---|---|---|---|
| Oxidative Stability Test | | | | |
| neutralisation value (mg KOH/g) | IEC 74 | 5.00 | <0.01 | ≦0.40 |
| sludge, % by mass | | no sludge | <0.10 | ≦0.10 |
| Biodegradability and Toxicity Test | | | | |
| Biodegradability (%) | CEC-L33A94 | >95 | 30% | — |
| LC 50 for 96 hours (shrimp) | ESA SOP 107 (based on USEPA 1994 & 1996) | Virtually non-toxic | Relatively Toxic | — |

*It is recommended to compare saturation levels rather than moisture, as vegetable oil-based fluids have a much higher saturation point compared to mineral oil-based fluids.

Blend 3 was then further purified to remove water and conductive contaminants to improve its dielectric properties including moisture content, acid value, IFT, dielectric strength, dissipation factor and oxidative stability (see Table 3). The purification methods are described below.

TABLE 3

Thermal, physical, chemical, electrical and biodegradation characteristics of Blend 3, mineral oil, and permissible values for dielectric fluids used in transformers.

| Characteristics | Test Method | Test Value of 50:50 Blend | Typical Mineral Oil Value | Permissible values for measured characteristics |
|---|---|---|---|---|
| Physical Test: | | | | |
| Viscosity @ 40° C. cSt, maximum | ISO 3104 | 15.3 | 10 | ≦16.5 |
| Moisture Content, ppm, maximum* | IEC 733 | 80 | 10-30 | ≦30 |
| Chemical Test | | | | |
| Acid Value mg KOH/g, maximum | IEC 296 | 0.015 | 0.01 | ≦0.03 |
| IFT dynes/cm minimum | | 28 | 40 | ≧40 |
| Electrical Test | | | | |
| Dielectric Strength kV, minimum | IEC 156 | 70 | 70 | ≧50 |
| Dissipation Factor @ 90° C., maximum | IEC 247 | 0.045 | 0.001 | ≦0.01 |
| Oxidative Stability Test | | | | |
| neutralisation value (mg KOH/g) | IEC 74 | 0.37 | <0.01 | ≦0.40 |
| sludge, % by mass | | no sludge | <0.10 | ≦0.10 |
| Biodegradability and Toxicity Test | | | | |
| Biodegradability (%) | CEC-L33A94 | >95 | 30% | — |

*It is recommended to compare saturation levels rather than moisture, as vegetable oil-based fluids have a much higher saturation point compared to mineral oil-based fluids.

Purification Methods

Moisture Content

The dielectric fluid composition was dehydrated by eluting the dielectric fluid composition under gravity through a column packed with a proprietary starch (PS-Multi). Alternatively, the dielectric fluid composition was dehydrated by eluting the dielectric fluid composition under gravity through a column packed with molecular sieves (3 Å) with the following composition: 0.6 $K_2O$:0.40 $Na_2O$:1.0 $Al_2O_3$:2.0±0.1 $SiO_2$:x $H_2O$.

Acid Value and IFT

Conductive contaminants were depleted from the dielectric fluid composition by eluting the dielectric fluid composition under gravity through a column packed with attapulgite.

Pour Point

The pour point of the dielectric fluid composition was decreased by adding a pour point depressant Viscoplex® 10-950 at 0.5% w/w of the dielectric fluid composition.

Alternatively, the pour point of the dielectric fluid composition can be decreased by winterizing the dielectric fluid as follows: the dielectric fluid composition was cooled to 7° C., then filtered to removed the crystallised particles. The remaining liquid filtrate was slowly chilled again to ensure no more crystals were formed. Slow cooling allowed for the growth of large crystals which were easily filtered.

Dielectric Voltage and Dissipation Factor

The dielectric voltage and dissipation factors of the dielectric fluid composition were significantly improved to acceptable standards for use as a dielectric fluid in electrical transformers by eluting the dielectric fluid composition under gravity through a column packed with sequential layers of molecular sieves (3 A) and attapulgite. Both the molecular sieves and the attapulgite were oven dried at 110° C. for 24 hours prior to use. The column comprised a first layer of molecular sieves (20 g, 4 cm), a second layer of attapulgite (70 g, 20 cm), and a third layer of molecular sieves (80 g, 16 cm).

By passing the dielectric fluid composition through the molecular sieves first, one ensures that the dielectric fluid composition is semi-dry before it passes through the attapulgite. This reduces the chance of wetting the clay which would hinder the clay's efficiency. The final layer of molecular sieves removes any moisture still present in the dielectric fluid composition. The above procedures successfully provide the dielectric fluid composition to electrical grade standard comparable to mineral oils.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

The invention claimed is:

1. A dielectric fluid composition comprising:

an oil of a high mono-unsaturated fatty acid content wherein the mono-unsaturated fatty acid content of the oil is greater than 60%; and one or more fatty acid alkyl esters, each having a fatty acid moiety and an alkyl moiety, wherein the alkyl moiety of the fatty acid alkyl esters has 1 to 4 carbon atoms and wherein the fatty acid moieties of the fatty acid alkyl esters are substantially homologous with the mono-unsaturated fatty acid content of the oil of the dielectric fluid composition and wherein about 60% or more of the fatty acid moieties of the fatty acid alkyl esters are derived from one or more mono-unsaturated fatty acids; and wherein the oil is in the range of 40%-60% v/v of the dielectric fluid composition and the fatty acid alkyl ester is in the range of 40%-60% v/v of the dielectric fluid composition.

2. The dielectric fluid composition according to claim 1, wherein the oil is selected from the group comprising: natural vegetable oil, synthetic vegetable oil, genetically modified vegetable oil, animal fat, bacterially derived oil, fungally derived oil and mixtures thereof.

3. A dielectric fluid composition according to claim 1, wherein the viscosity of the dielectric fluid composition is <20 cSt at 40° C.

4. A dielectric fluid composition comprising:

an oil containing at least one mono-unsaturated fatty acid wherein the mono-unsaturated fatty acid content of the oil is greater than 60%; and one or more fatty acid alkyl esters, each having a fatty acid moiety and an alkyl moiety, wherein the alkyl moiety of the fatty acid alkyl esters has 1 to 4 carbon atoms and wherein the fatty acid moieties of the fatty acid alkyl esters are substantially homologous with the mono-unsaturated fatty acid content of the oil of the dielectric fluid composition and wherein about 60% or more of the fatty acid moieties of the fatty acid alkyl esters are derived from one or more mono-unsaturated fatty acids; and wherein the oil is in the range of 40%-60% v/v of the dielectric fluid composition and the fatty acid alkyl ester is in the range of 40%-60% v/v of the dielectric fluid composition, wherein the viscosity of the dielectric solution is greater than 0 and less than 20 cSt at 40° C.

5. A dielectric fluid composition according to claim 4 wherein the viscosity of the composition is between 1 and 20 cSt at 40° C.

6. A transformer having a housing which accommodates a transformer core/coil assembly and the dielectric fluid composition of claim 1 surrounding said core/coil assembly.

7. A viscosity modifier for oil-based dielectric fluids having a high mono-unsaturated fatty acid content, the viscosity modifier comprising one or more fatty acid alkyl esters having an alkyl moiety and a fatty acid moiety, wherein the alkyl moiety has 1 to 4 carbon atoms and wherein the fatty acid moieties of the fatty acid alkyl esters are substantially homologous with the mono-unsaturated fatty acid content of the oil of the dielectric fluid composition and wherein about 60% or more of the fatty acid moieties of the fatty acid alkyl esters are derived from one or more mono-unsaturated fatty acids.

8. The viscosity modifier according to claim 7, wherein the mono-unsaturated fatty acids are selected from a group consisting of obtusilic, caproleic, lauroleic, linderic, myristoleic, physeteric, tsuzuic, palmitoleic, petroselinic, oleic, vaccenic, gadoleic, gondoic, cetoleic, erucic, and nervonic.

* * * * *